(12) United States Patent
Hynum et al.

(10) Patent No.: US 9,206,693 B2
(45) Date of Patent: Dec. 8, 2015

(54) APPARATUS, METHOD, AND SYSTEM FOR SEPARATING PARTICLES FROM A FLUID STREAM

(75) Inventors: Daniel Hynum, Simpsonville, SC (US); Andrew P. Giametta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1000 days.

(21) Appl. No.: 13/030,187

(22) Filed: Feb. 18, 2011

(65) Prior Publication Data

US 2012/0210722 A1     Aug. 23, 2012

(51) Int. Cl.
*F01D 5/08* (2006.01)
*F01D 25/32* (2006.01)
(52) U.S. Cl.
CPC ............. *F01D 5/081* (2013.01); *F01D 5/085* (2013.01); *F01D 25/32* (2013.01); *F05D 2250/73* (2013.01); *F05D 2260/607* (2013.01); *Y02T 50/676* (2013.01)
(58) Field of Classification Search
CPC ............. F02C 7/00; F02C 7/12; F01N 3/021; F01D 25/12; D01D 5/08; D01D 5/081; D01D 5/087; D01D 5/082; D01D 5/084; D01D 5/085; F05D 2240/61; F05D 2240/63; B01D 45/12; B01D 45/14; B01D 45/04
USPC ......... 60/39.08, 782, 785, 795, 806; 415/145, 415/199.5; 416/95, 96 R, 97 R; 184/6.11
See application file for complete search history.

(56) References Cited

U.S. PATENT DOCUMENTS

| | | | |
|---|---|---|---|
| 2,788,951 A * | 4/1957 | Flint | 415/112 |
| 3,521,431 A | 7/1970 | Connors et al. | |
| 5,117,626 A | 6/1992 | North et al. | |
| 5,353,721 A | 10/1994 | Mansour et al. | |
| 5,472,316 A | 12/1995 | Taslim et al. | |
| 5,482,435 A | 1/1996 | Dorris et al. | |
| 5,924,843 A | 7/1999 | Staub et al. | |
| 6,033,450 A * | 3/2000 | Krul et al. | 55/345 |
| 6,398,833 B1 * | 6/2002 | Santerre et al. | 55/409 |
| 6,702,547 B2 * | 3/2004 | Tiemann | 415/115 |
| 7,678,165 B2 | 3/2010 | Tingle et al. | |
| 7,717,666 B2 | 5/2010 | Roney, Jr. et al. | |

(Continued)

FOREIGN PATENT DOCUMENTS

| | | |
|---|---|---|
| CN | 1120319 A | 4/1996 |
| CN | 101608564 A | 12/2009 |
| DE | 4324034 A1 | 1/1995 |
| DE | 102004061173 A1 | 7/2006 |
| EP | 0823541 A1 | 2/1998 |

(Continued)

OTHER PUBLICATIONS

European Search Report dated Jun. 23, 2014.

(Continued)

*Primary Examiner* — Craig Kim
(74) *Attorney, Agent, or Firm* — McNees Wallace & Nurick LLC

(57) ABSTRACT

A rotating machine and associated method is disclosed that includes one or more cooling channels for providing a cooling fluid to a component. The cooling channels pass through a rotating component. The rotating machine further includes one or more particle separation slots in the rotating component in fluid communication with the one or more channels for removing particulate contamination.

18 Claims, 5 Drawing Sheets

(56) References Cited

U.S. PATENT DOCUMENTS

| | | | |
|---|---|---|---|
| 8,029,601 B2* | 10/2011 | Franzen et al. | 95/77 |
| 8,677,766 B2* | 3/2014 | Laurello et al. | 60/806 |
| 2009/0133581 A1* | 5/2009 | Fang et al. | 96/216 |
| 2009/0134243 A1* | 5/2009 | Mount et al. | 239/265.27 |
| 2009/0297350 A1 | 12/2009 | Augustine et al. | |
| 2010/0005804 A1 | 1/2010 | Chen et al. | |
| 2010/0146987 A1* | 6/2010 | Isomura | 60/806 |
| 2010/0196167 A1* | 8/2010 | Ammann | 416/97 R |
| 2010/0221099 A1 | 9/2010 | Giametta | |
| 2011/0247347 A1* | 10/2011 | Ebert et al. | 60/806 |

FOREIGN PATENT DOCUMENTS

| | | |
|---|---|---|
| EP | 2206883 A2 | 7/2010 |
| EP | 2213836 A2 | 8/2010 |
| EP | 2224113 A2 | 9/2010 |
| GB | 857750 | 1/1961 |

OTHER PUBLICATIONS

Unofficial English translation of Office Action issued in connection with corresponding CN Application No. 201210041493.4 on Oct. 10, 2014.

\* cited by examiner

APPARATUS, METHOD, AND SYSTEM FOR SEPARATING PARTICLES FROM A FLUID STREAM

FIELD OF THE INVENTION

The present invention is generally directed to an apparatus, system and method for separating particles from a fluid, and more specifically directed to an apparatus, system and method for separating particles from a cooling air stream of a turbine.

BACKGROUND OF THE INVENTION

A gas turbine engine or combustor converts chemical energy of a fuel or a fuel and air mixture into thermal energy. Gas turbines include a compressor that compresses air which is channeled to a combustor where it is mixed with fuel and ignited for generating combustion gases. The combustion gases flow downsteam through one or more stages of turbines and over the turbine's blades, spinning the turbine, which powers the compressor and, for some turbines, drives their mechanical output. The energy given up to the turbine comes from the reduction in the temperature of the exhaust gas. Energy is extracted in the form of shaft power, compressed air and thrust, in any combination, and used to power generators, aircraft, trains, and ships.

A turbine stage includes a row of turbine rotor blades secured to the outer perimeter of a rotor disk with a stationary turbine nozzle having a plurality of stator vanes disposed upstream therefrom. The combustion gases flow between the stator vanes and the turbine blades for extracting energy to rotate the rotor disk. The temperatures within gas turbines may exceed 2500° F. and cooling of turbine blades is very important in terms of blade longevity. The turbine blades and vanes include small internal cavities and channels to provide cooling. Without cooling, turbine blades would rapidly deteriorate.

Since the combustion gasses are hot, the turbine vanes and blades are typically cooled with a portion of air bled from the compressor for this purpose. Diverting any portion of the compressor air from use in the combustor necessarily decreases the overall efficiency of the gas turbine. It is desired to cool the vanes and blades with as little compressor bleed air as possible. Particle contamination in the cooling air may block or restrict cooling airflow through the cooling cavities and channels.

Accordingly, it would be desirable to provide a particle separator system that provides particle separation from the cooling airflow without affecting or minimizing the effect on cooling airflow to the compressor that may undesirably affect performance.

SUMMARY OF THE INVENTION

According to an exemplary embodiment of the present disclosure, a rotating machine is disclosed that includes a first machine portion, a second machine portion, and a rotating machine portion connecting the first machine portion to the second machine portion. The rotating machine portion includes one or more cooling channels for providing cooling air to the second machine portion, and one or more particle separation slots fluidly connect one or more of the one or more cooling channels to a cavity.

According to another exemplary embodiment of the present disclosure, a gas turbine is disclosed that includes a compressor for compressing a fluid, a turbine for receiving the fluid after compression and combustion, and a rotor shaft connecting the compressor to the turbine. One or more cooling channels in the rotor shaft provide cooling air to the turbine, and one or more particle separation slots fluidly connect one or more of the one or more cooling channels to a rotor shaft cavity surrounding the rotor shaft.

According to another exemplary embodiment of the present disclosure, a method of separating contaminant particles from a cooling stream is disclosed that includes providing a rotating machine. The rotating machine includes a first machine portion, a second machine portion, and a rotating machine portion. The method further includes extracting a fluid stream from a first machine portion, providing the extracted fluid steam to a rotating machine portion, and providing the fluid stream from the rotating machine portion to a second machine portion. A portion of the fluid steam is diverted from the rotating machine portion to remove contaminant particles from the fluid stream.

One advantage of an embodiment of the present disclosure includes separating particles from air intake with minimal effect on turbine performance.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present disclosure now will be described more fully hereinafter with reference to the accompanying drawings, in which an exemplary embodiment of the disclosure is shown. This disclosure may, however, be embodied in many different forms and should not be construed as limited to the embodiments set forth herein.

Figure 1:
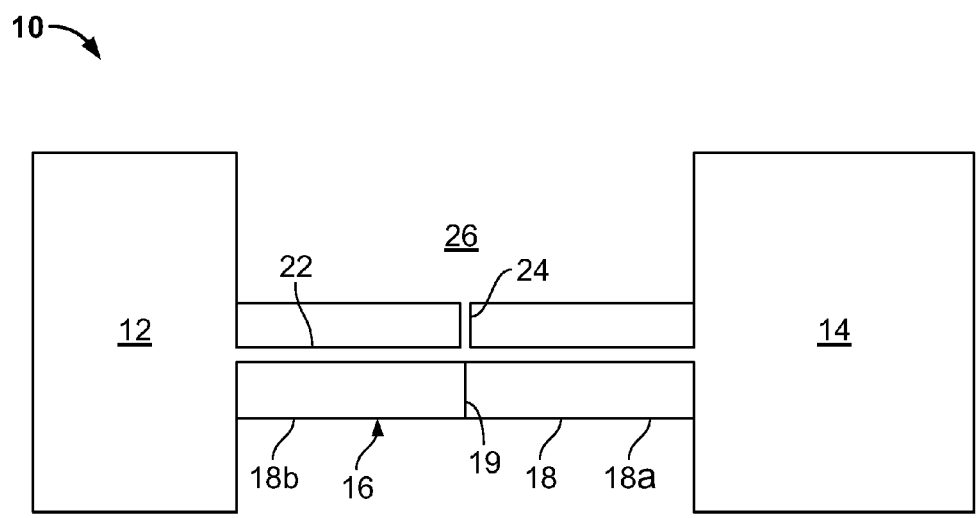
FIG. 1 is a block diagram of a rotating machine according to the present disclosure.

FIG. 1 illustrates a block diagram of a rotating machine 10 that includes a first machine portion 12, a second machine portion 14, and a rotating machine portion 16 connecting the first machine portion 12 to the second machine portion 14. The rotating machine 10 may be a gas turbine, a gas combustor, a rotating machine for converting chemical energy to mechanical energy, or other rotating machine having at least one cooling passage through a rotating component thereof.

The first machine portion 12 may be a stationary or rotating machine portion. In an embodiment, the first machine portion 12 may be a rotating machine portion. In an embodiment, the first machine portion 12 may be a compressor. In an embodiment, the first machine portion 12 may be a compressor section of a gas turbine.

The second machine portion 14 may be a stationary or rotating machine portion. In an embodiment, the second machine portion 14 may be a rotating machine portion. In an embodiment, the second machine portion 14 may be a turbine. In an embodiment, the second machine portion 14 may be a turbine section of a gas turbine.

The rotating machine portion 16 includes a rotating member 18. The rotating member 18 includes a first rotating member portion 18a and a second rotating member portion 18b. In another embodiment, the rotating member 18 may include one or more rotating member portions. The rotating machine portion 16 may further include rotational supports, bearings and/or other rotating machine portion components (not shown). In an embodiment, the rotating member 18 may be a rotor shaft. In another embodiment, the rotating member 18 may be a rotor shaft of a gas turbine.

The rotating member 18 includes a first rotating member section 18a and a second rotating member section 18b joined at interface 19. In another embodiment, the rotating member 18 may include one or more rotating sections. In another embodiment, the rotating member 18 may include two or more rotating sections joined at one or more joints. In an embodiment, the joint 19 may be a bolted joint. In an embodiment, the joint 19 may be a marriage joint of a rotor shaft. In another embodiment, joint 19 may be a metallurgically joined interface, such as, but not limited to, a welded interface. In another embodiment, where the rotating member 18 is a single, unitary structure, the joint 19 may be omitted.

The rotating member 18 includes a cooling channel 22 for providing a fluid steam of a cooling fluid from the first machine portion 12 to the second machine portion 14. The cooling channel 22 is in fluid communication between the first machine portion 12 and the second machine portion 14. In another embodiment, the rotating member 18 may include one or more cooling channels for providing a cooling fluid from the first machine portion 12 to the second machine portion 14. In an embodiment, the cooing fluid may be air. In an embodiment, a cooling fluid is bled from a first machine portion fluid system of the first machine portion 12 to the cooling channel 22. In another embodiment, a cooling fluid is bled from a compressor section of the first machine portion 12. In another embodiment, cooling fluid is bled from a compressor of a gas turbine.

The rotating member 18 further includes a particle separation slot 24 in fluid communication with the cooling channel 22. In another embodiment, the rotating member 18 may include one or more particle separation slots 24. In another embodiment, the rotating member 18 may include one or more particle separation slots 24 in fluid communication with one or more cooling channels 22. The particle separation slot 24 bleeds cooling fluid from the cooling channel 22 and provides the cooling fluid to a fluid cavity 26. The fluid cavity 26 may be a void, channel or other space for receiving the cooling fluid. The fluid cavity 26 may be in fluid communication with another fluid void, channel or space (not shown). In an embodiment, the fluid cavity 26 may be in fluid communication with the second machine portion 14.

The particle separation slot 24 is disposed between adjoining first and second rotating member sections 18a, 18b of rotating member 18 at joint 19. In another embodiment, one or more particle separation slots 24 may be disposed in one or more joints 19. In another embodiment, the particle separation slots may be disposed in a solid section of the rotating member 18. The particle separation slot 24 may be machined, cast or otherwise formed into the first and/or second rotating member sections 18a, 18b.

The particle separation slot 24 diverts between about 1 volume percent (vol. %) to about 10 vol. % of the cooling fluid from the cooling channel 22 to the fluid cavity 26. In another embodiment, one or more particle separation slots 24 divert between about 1 volume percent (vol. %) to about 10 vol. % of cooling fluid from the cooling channels 22 to the fluid cavity 26. In another embodiment, one or more particle separation slots 24 divert between about 1 vol. % and about 6 vol. % of cooling fluid from the cooling channels 22 to the fluid cavity 26. In another embodiment, one or more particle separation slots 24 divert between about 1 vol. % and about 4 vol. % of cooling fluid from the cooling channels 22 to the fluid cavity 26. In yet another embodiment, one or more particle separation slots 24 divert about 1 vol. % of cooling fluid from the cooling channels 22 to the fluid cavity 26. In such a manner, contaminant particles are separated from cooling fluid while minimizing the effect on the performance of the rotating machine 10.

Figure 2:
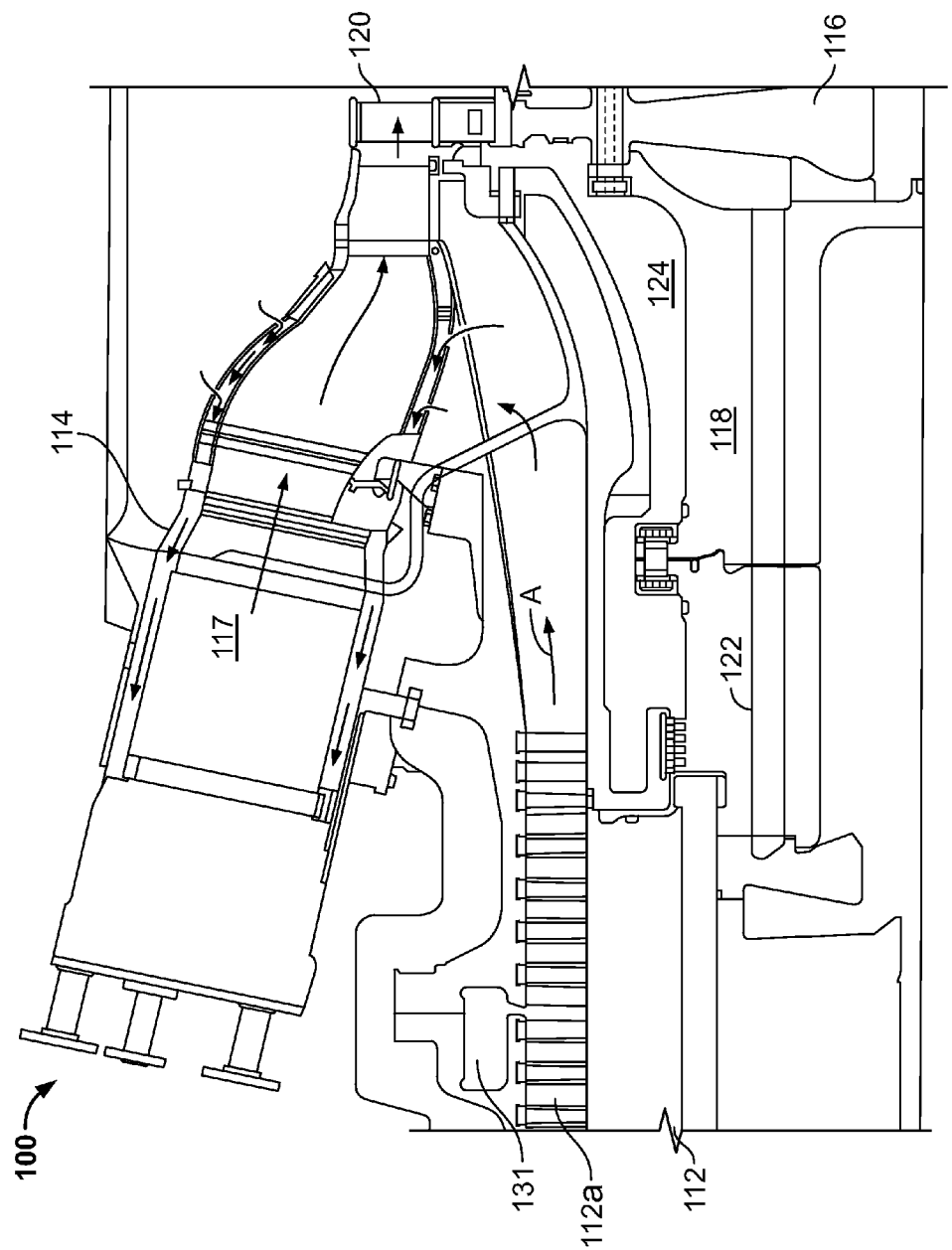
FIG. 2 is a partial cross-sectional view of an exemplary embodiment of a gas turbine according to the invention.

FIG. 2 illustrates a partial view of an exemplary embodiment of a gas turbine 100 according to the present disclosure. The gas turbine 100 includes a compressor 112, a combustor 114, and a turbine 116. The compressor 112 includes compressor blades 112a and provides compressed air to the combustor 114. The direction of flow of the compressed air is generally shown by arrows A. Fuel is injected into the combustor 114 where it mixes with the compressed air and is ignited in a combustion chamber 117. The hot gas product of the combustion flows to the turbine 116, which extracts work from the hot gas by a plurality of turbine blades 120 that drive a shaft 118, which in turn drives the compressor 112.

Figure 3:
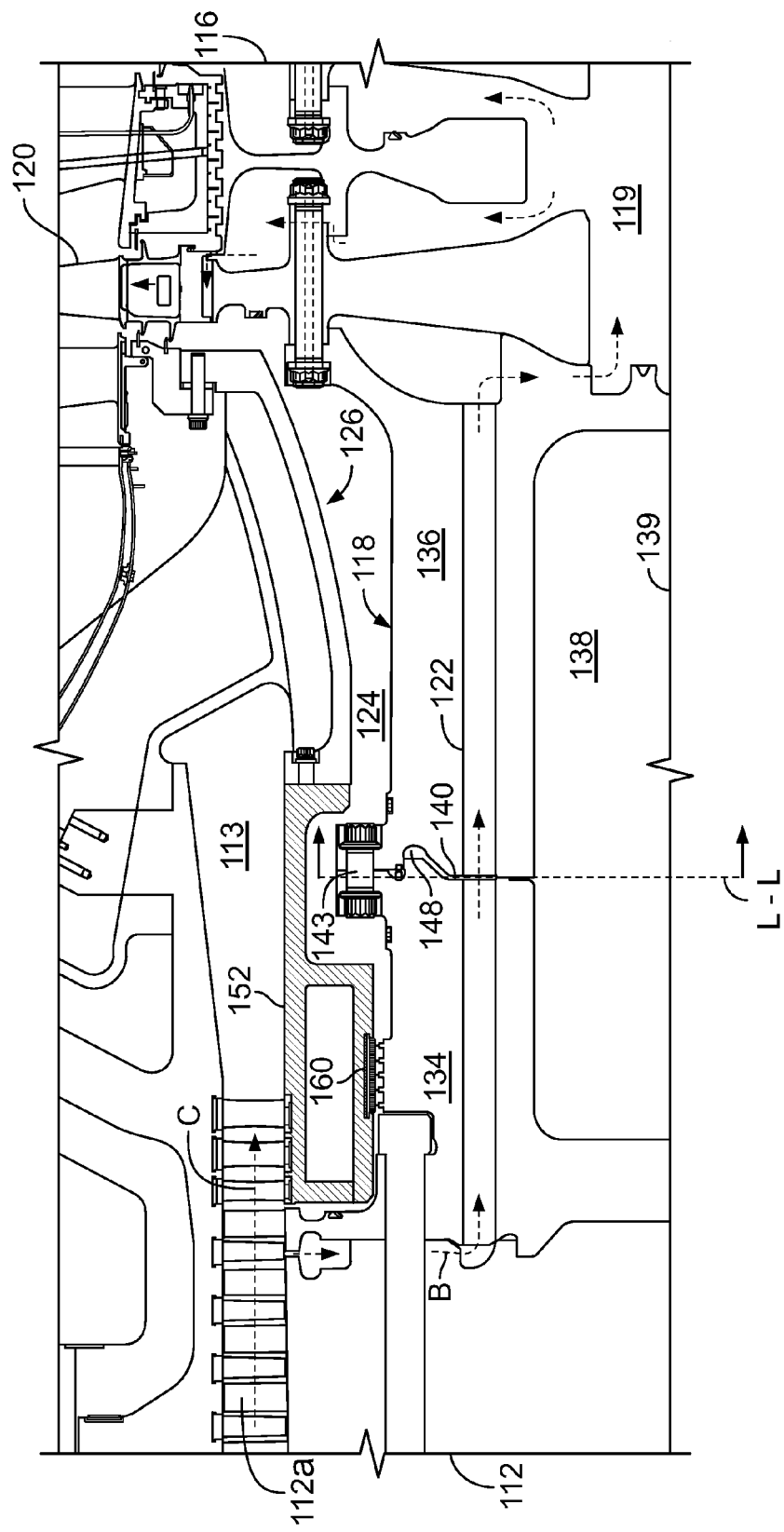
FIG. 3 is an enlarged view of a portion of FIG. 2.

FIG. 3 illustrates a more detailed view of a portion of FIG. 2. As can be seen in FIG. 3, the shaft 118 includes a first rotor shaft section 134, a second rotor shaft section 136, a rotor bore 138, and centerline 139. The first rotor shaft section 134 may be a compressor aft shaft. The second rotor shaft section 136 may be a turbine distance piece. In another embodiment, the shaft 118 may include one or more rotor shaft sections. In another embodiment, the shaft 18 may be a single, unitary rotor shaft section. The shaft 118 is at least partially disposed in a rotor shaft cavity 124. The rotor shaft cavity 124 is the space defined between the shaft 118 and turbine inner wall 126.

The first and second rotor shaft sections 134, 136 are joined at an interface or joint 140. The first and second rotor shaft sections 134, 136 are joined by bolts 143. In this exemplary embodiment, the first and second rotor shaft sections 134, 136 are joined by 30 bolts 143. In another embodiment, the first and second rotor shaft sections 134, 136 may be joined by a plurality of bolts 143. In an embodiment, the joint 140 may be a marriage joint, and the bolts 143 may be a plurality of marriage bolts. In another embodiment, the shaft 118 may include two or more shaft sections connected at one or more joints. In another embodiment, the shaft 118 may include two or more shaft sections joined by one or more marriage joints.

Figure 4:
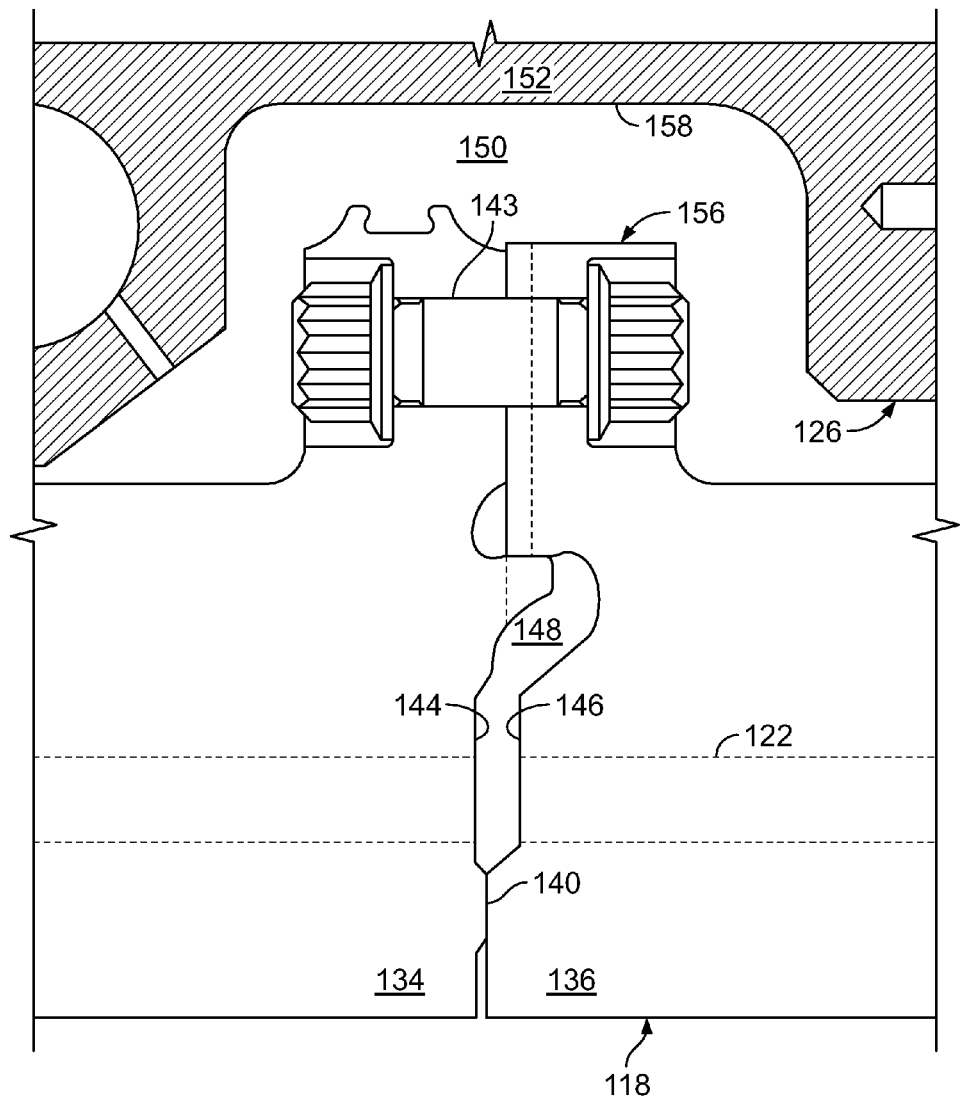
FIG. 4 is an enlarged view of a portion of FIG. 3.
Figure 5:
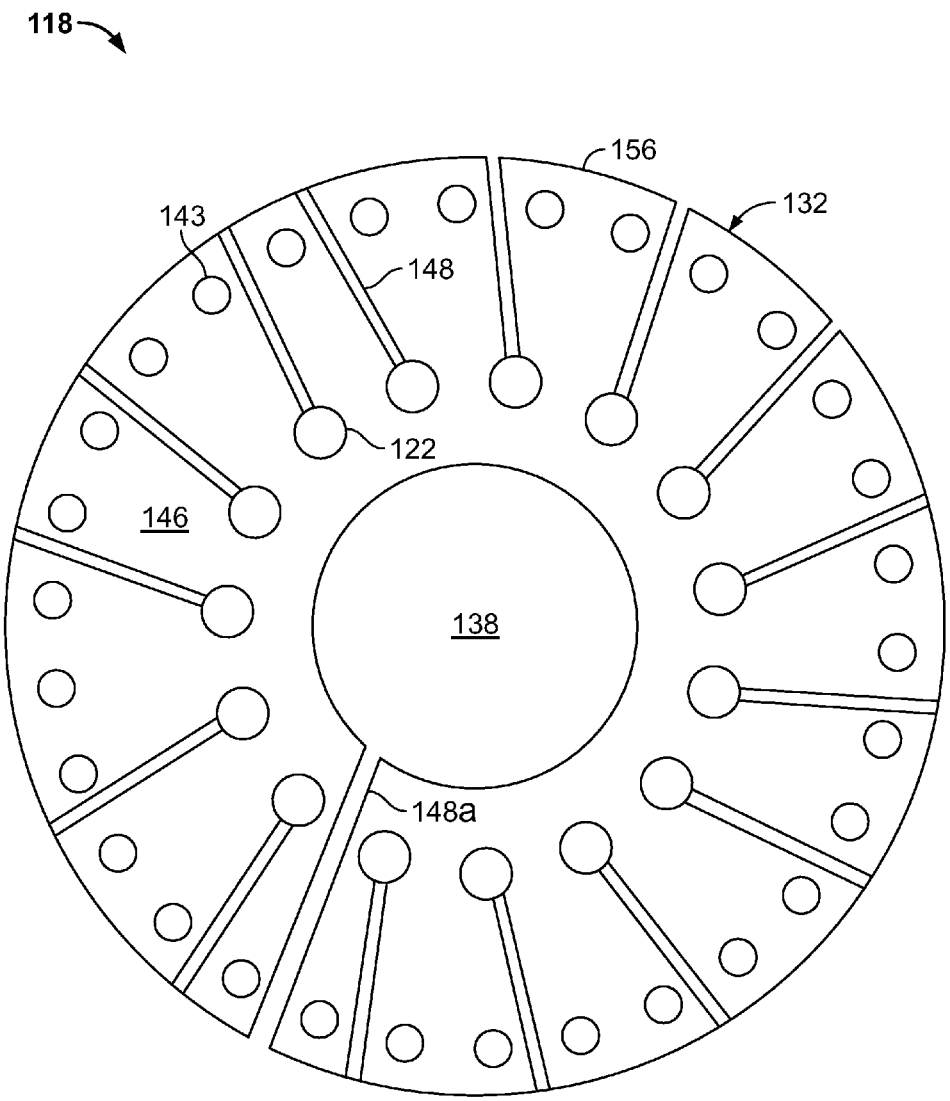
FIG. 5 is a cross sectional view of a joint of the rotor shaft of FIG. 3.

Referring to FIGS. 3, 4 and 5, the shaft 118 includes cooling channels 122. In this exemplary embodiment, the shaft 118 includes 15 cooling channels 122 (see FIG. 5). In another embodiment, the shaft 118 may include one or more cooling channels. The cooling channels 122 are in fluid communication with the compressor 112 and the turbine 116. The cooling channels 122 pull or bleed air from the compressor 112 and provide the air to the turbine 116. The air is then provided to cool a plurality of turbine blades 120. In another embodiment, the air may be provided to cool other components of the turbine 116. The flow of cooling air is generally shown by arrows B (see FIG. 3). In another embodiment, the cooling channels 122 may be located in another rotational component of the gas turbine 100.

In this exemplary embodiment, air is bled from the air compressor flow path, which is generally shown by arrow C. In another embodiment, air may be bled from another stationary or rotational structure or point of the gas turbine 100. In another embodiment, air may be bled from a stationary or rotational structure or point of the compressor 112. For example, air may be bled from an outer diameter extraction cavity 131 or the diffuser region 113.

In this embodiment, the cooling channels 122 provide air to the turbine 116, and in particular to a rotor cavity 119. In another embodiment, cooling channels 122 may provide air to another structure or point of the turbine 116. In another embodiment, air may be provided to another stationary or rotational structure or point of the turbine 116.

Referring to FIG. 4, joint 140 is formed between the first and second rotor shaft sections 134, 136, where a first rotor shaft section end surface 144 and a second rotor shaft section end surface meet, join and contact. Cooling channels 122 traverses across and through joint 140 from the first rotor shaft section 134 to the second rotor shaft section 136, and more particularly, through first and second rotor shaft section surfaces 144, 146.

Particle separation slots 148 are formed in the joint and defined by and between the first and second rotor shaft sections 134, 136. Particle separation slots 148 fluidly connect cooling channels 122 to inner barrel cavity 150, which is a section of the rotor shaft cavity 124 (FIG. 2). Inner barrel cavity 150 is defined by the outer surface 157 of shaft 118 and the inner barrel surface 158 of an inner barrel 152.

FIG. 5 illustrates a sectional view of joint 140 taken along line L-L. Line L-L has been extended to section the whole shaft 118 of the partial view of the shaft 118 shown in FIG. 3. As can be seen in FIG. 5, joint holes 154 are uniformly, circumferentially distributed around the shaft 118. Particle separation slots 148 fluidly connect cooling channels 122 to the outer surface 156 of the shaft 118 and inner barrel cavity 150 (FIG. 4). In this exemplary embodiment, cooling fluid channels 122 connect a corresponding number of particle separation slots 148 to the outer surface 156. In another embodiment, one or more particle separation slots 148 may connect one or more of the one or more cooling channels 122 to outer surface 156.

Particle separation slots 148 divert between about 1 vol. % to about 10 vol. % of the airflow from the cooling channels 122 to the rotor shaft cavity 124 (FIG. 2). In another embodiment, one or more particle separation slots 148 divert between about 1 volume percent (vol. %) to about 10 vol. % of the airflow from the cooling channels 122 to the inner barrel cavity 150. In another embodiment, one or more particle separation slots 148 divert between about 1 vol. % and about 6 vol. % of the airflow from the cooling channels 122 to the inner barrel cavity 150. In another embodiment, one or more particle separation slots 148 divert between about 1 vol. % and about 4 vol. % of the airflow from the cooling channels 122 to the inner barrel cavity 150. In yet another embodiment, one or more particle separation slots 148 divert about 1 vol. % of the airflow from the cooling channels 122 to the inner barrel cavity 150.

As can be further seen in FIG. 5, another particle separation slot 148a fluidly connects rotor bore 138 to outer surface 156 and inner barrel cavity 150 (FIG. 4). In another embodiment, one or more another particle separation slots 148a may fluidly connect rotor bore 138 to outer surface 156. In another embodiment, the another particle separation slot 148a may be omitted.

Referring to FIGS. 4 and 5, the particle separation slots 148 may be initially cast or later machined into the joint 140. In an embodiment, the particle separation slots 148 may be formed on one or both of the first rotor shaft end surface 144 and/or the second rotor shaft end surface 146. In yet another embodiment, the particle separation slots 148 may be formed on both the first and second rotor shaft end surfaces 144, 146. In yet another embodiment, corresponding particle separation slots 148 may be mirrored on the first and second rotor shaft end surfaces 144, 146 so as to both define the particle separation slots 148. In yet another embodiment, the particle separation slots 148 are initially cast or machined into a solid portion of the shaft 118 at any position along the centerline 139 (FIG. 2) in fluid communication between the cooling channels 122 and the rotor shaft cavity 124.

An embodiment of a method of operating the particle separation system will now be described below. During operation, air containing contaminant particles flows from the compressor 112 to the turbine 116 via cooling channels 122. As the air flows past the particle separation slots 148, a portion of the cooling air is diverted into the particle separation slots 148. Contaminant particles (not shown) are urged into the particle separation slots 148 with the diverted air by centrifugal force created by the rotating shaft 118. The contaminant particles flow through the particle separation slots 148 towards the outer surface 156 of the shaft 118.

In another embodiment, air is provided to rotor bore 138 by channels, conduits or piping (not shown) from the compressor 112. In an embodiment, air is provided to the rotor bore 138 from another source of air, such as, but not limited to the gas turbine 100. The air is provided from the rotor bore 138 to the turbine 116 through a channel, conduit or piping (not shown). As the air flows past the another particle separation slot 148a, a portion of the air is diverted to the another particle separation slot 148a. Contaminant particles (not shown) are acted on by centrifugal force created by the rotating shaft 118 to urge the contaminant particles into the another particle separation slot 148a with the diverted air. The contaminant particles flow through the another particle separation slot 148a towards the outer surface 156 of the shaft 118 and into the inner barrel cavity 150.

Referring again to FIGS. 3 and 4, as the contaminant particles exit the particle separation slots 148, 148a, centrifugal force accelerate the contaminant particles into the inner barrel cavity 150 and towards the inner barrel 152, where the some or all of the contaminant particles may collect on inner barrel surface 158. In another embodiment, contaminant particles flow from the particle separation slots 148, 148a into rotor shaft cavity 124. In an embodiment, the contaminant particles may collect on turbine inner wall 126.

Referring again to FIG. 3, air may be provided from the compressor 112 to the turbine 116 through rotor shaft cavity 124. The air may be provided by leakage, or as provided by engineered design. In an embodiment, air is provided to the rotor shaft cavity 124 through rotating seal 160. In an embodiment, air provided to the rotor shaft cavity 124 may remove some or all contaminant particles built up on inner barrel surface 158. In another embodiment, air provided to the rotor shaft cavity 124 may remove some or all of contaminant particles from rotor shaft cavity 124. The contaminant particles removed from the inner barrel surface 158 and/or rotor shaft cavity 124 may be provided to the turbine 116.

In another embodiment, contaminant particles removed from the inner barrel surface 158 and/or rotor shaft cavity 124 may be provided to the turbine 116 where combustion gases pass through the turbine 116. In another embodiment, some or all of the contaminant particles maybe removed from the rotor shaft cavity 124 and provided to the turbine 168 and/or allowed to disperse and/or collect on other gas turbine components.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A rotating machine, comprising:
   a first machine portion;
   a second machine portion; and
   a rotating machine portion connecting the first machine portion to the second machine portion;
   wherein the rotating machine portion comprises a rotating shaft including one or more cooling channels for providing cooling air to the second machine portion;
   wherein one or more particle separation slots fluidly connect one or more of the one or more cooling channels to a cavity, the particle separation slots being arranged and disposed to facilitate flow of a portion of the cooling air from the first machine portion to the cavity and to urge particles into the particle separation slots in the same direction as the flow of the portion of the cooling air toward the cavity, the flow of the particles being by centrifugal forces and the centrifugal forces being provided by the rotating machine portion; and
   wherein the one or more particle separation slots divert between about 1 vol. % and about 10 vol. % of cooling fluid from the one or more cooling channels, a remaining portion of the cooling fluid flowing toward the second machine portion.

2. The rotating machine of claim 1, wherein the one or more particle separation slots divert between about 1 vol. % and about 4 vol. % of cooling fluid from the one or more cooling channels.

3. The rotating machine of claim 1, wherein the rotating machine portion comprises a first section connected to a second section at a joint, and wherein the one or more particle separation slots are disposed through the joint.

4. The rotating machine of claim 1, wherein cooling air is provided to the one or more cooling channels from the first machine portion.

5. The rotating machine of claim 1, wherein the one or more cooling channels provides cooling fluid to components of the second machine portion.

6. The rotating machine of claim 1, wherein the cavity surrounds the rotating machine portion.

7. A gas turbine, comprising:
   a compressor for compressing a fluid;
   a turbine for receiving the fluid after compression; and
   a rotor shaft connecting the compressor to the turbine;
   one or more cooling channels in the rotor shaft for providing cooling air to the turbine; and
   one or more particle separation slots fluidly connect one or more of the one or more cooling channels to an outer surface of the rotor shaft and a rotor shaft cavity surrounding the rotor shaft, the particle separation slots being arranged and disposed to facilitate flow of a portion of the cooling air to the cavity and to urge particles into the particle separation slots in the same direction as the flow of the portion of the cooling air toward the cavity by centrifugal forces and the centrifugal forces being provided by the rotating machine portion;
   wherein the one or more particle separation slots divert between about 1 vol. % and about 10 vol. % of cooling fluid from the one or more cooling channels.

8. The gas turbine of claim 7, wherein the one or more particle separation slots divert between about 1 vol. % and about 4 vol. % of cooling fluid from the one or more cooling channels.

9. The gas turbine of claim 7, wherein the rotor shaft comprises a first section connected to a second section at a joint, and wherein the one or more particle separation slots are disposed through the joint.

10. The gas turbine of claim 7, wherein cooling air is provided to the one or more cooling channels from the compressor.

11. The gas turbine of claim 7, wherein the one or more cooling channels provides cooling fluid to turbine blades of the turbine.

12. The gas turbine of claim 7, wherein the one or more cooling channels comprises a borehole through the rotor shaft.

13. The gas turbine of claim 7, further comprising a stationary inner barrel defining an open cavity around an outer surface of the rotor shaft where the one or more particle separation slots connect to the outer surface.

14. A method of separating contaminant particles from a cooling stream, comprising:
   providing a rotating machine comprising a first machine portion, a second machine portion, and a rotating machine portion;
   extracting a fluid stream from the first machine portion;
   providing the extracted fluid stream to the rotating machine portion; and
   providing the fluid stream from the rotating machine portion to the second machine portion;
   wherein a portion of the fluid stream is diverted via particle separation slots from the rotating machine portion to remove contaminant particles from the fluid stream, the particle separation slots being arranged and disposed to facilitate flow of a portion of the cooling air to the cavity and to urge particles into the particle separation slots in the same direction as the flow of the portion of the cooling air toward the cavity by centrifugal forces and the centrifugal forces being provided by the rotating machine portion; and
   wherein the one or more particle separation slots divert between about 1 vol. % and about 10 vol. % of cooling fluid from the one or more cooling channels.

15. The method of claim 14, wherein the rotating machine portion is a rotor shaft and the fluid stream passes through one or more cooling channels within the rotor shaft.

16. The method of claim 14, wherein the second machine portion is a rotating machine portion.

17. The method of claim 14, wherein the second machine portion is a turbine.

18. The method of claim 14, wherein the rotating machine is a gas turbine.

* * * * *